United States Patent [19]
Miyashita et al.

[11] Patent Number: 5,604,606
[45] Date of Patent: Feb. 18, 1997

[54] PICTURE READING APPARATUS WITH FLARING LIGHT ELIMINATION CAPABILITY

[75] Inventors: Takaaki Miyashita; Kazuhiro Fujita, both of Yokohama, Japan

[73] Assignee: Ricoh Company, Ltd., Tokyo, Japan

[21] Appl. No.: 227,174

[22] Filed: Apr. 13, 1994

Related U.S. Application Data

[63] Continuation of Ser. No. 726,220, Jul. 5, 1991, abandoned.

[30] Foreign Application Priority Data

| Jul. 6, 1990 | [JP] | Japan | 2-179897 |
| Jul. 6, 1990 | [JP] | Japan | 2-179898 |
| Jul. 6, 1990 | [JP] | Japan | 2-179899 |
| Sep. 27, 1990 | [JP] | Japan | 2-260243 |
| Apr. 18, 1991 | [JP] | Japan | 3-115301 |

[51] Int. Cl.$^6$ .................................................. H04N 1/04
[52] U.S. Cl. .................... 358/474; 358/496; 250/208.1
[58] Field of Search ........................... 358/471, 472, 358/474, 475, 480, 481, 482, 484, 494, 496; 250/208.1

[56] References Cited

U.S. PATENT DOCUMENTS

| 3,800,076 | 3/1974 | Koizumi | 358/472 |
| 4,471,384 | 9/1984 | Sato et al. | 358/474 |
| 4,644,159 | 2/1987 | Miura | 250/208.1 |
| 4,680,644 | 7/1987 | Shirato et al. | 250/208.1 |
| 4,682,042 | 7/1987 | Igarashi | 250/208.1 |
| 4,689,652 | 8/1987 | Shimada et al. | 358/471 |
| 4,739,159 | 4/1988 | Inokuchi | 250/208.1 |
| 4,839,730 | 6/1989 | Shirakoshi et al. | 358/474 |
| 4,907,091 | 3/1990 | Yoshida et al. | 250/208.1 |
| 4,908,717 | 3/1990 | Natori | 358/474 |
| 4,908,718 | 3/1990 | Shimada | 358/471 |
| 5,038,027 | 8/1991 | Ioka | 358/484 |
| 5,081,347 | 1/1992 | Matsumoto | 250/208.1 |
| 5,121,225 | 6/1992 | Murata et al. | 358/471 |
| 5,214,273 | 5/1993 | Yokochi | 358/484 |

FOREIGN PATENT DOCUMENTS

| 63-217870 | 9/1988 | Japan . |
| 1-265660 | 10/1989 | Japan . |

Primary Examiner—Edward L. Coles, Sr.
Assistant Examiner—Thomas L. Stoll
Attorney, Agent, or Firm—Oblon, Spivak, McClelland, Maier & Neustadt, P.C.

[57] ABSTRACT

A picture reading apparatus with flaring light elimination capability, which includes a light source for emitting light, a contact glass with which a document to be scanned comes in contact, a lens array in which a plurality of lenses for converging the light from the light source are arranged at equal intervals therebetween, a roof mirror array in which a plurality of roof-like reflection surfaces are arranged corresponding to the plurality of lenses, a restricting plate for eliminating undesired light between adjacent lenses of the lens array, a housing in which the roof mirror array and the lens array are accommodated, a sensor, and a separation mirror. The apparatus further includes a light shield layer provided on the contact glass, at a portion other than a reading portion through which the light from the light source passes to scan the document, for eliminating undesired light, other than the converged light effective in supplying a picture signal.

14 Claims, 6 Drawing Sheets

PICTURE READING APPARATUS WITH FLARING LIGHT ELIMINATION CAPABILITY

This application is a continuation of application Ser. No. 07/726,220, filed on Jul. 5, 1991, now abandoned.

BACKGROUND OF THE INVENTION

1. Field of the Invention

The present invention generally relates to a picture reading apparatus, and more particularly to a picture reading apparatus with flaring light elimination capability, which is applicable to a picture reading part of a facsimile machine, an image scanner or the like.

2. Discussion of the Background

Japanese Laid-Open Patent Application No. 1-265660 discloses a conventional picture reading apparatus in which a focusing lens array is used, as shown in FIG. 1. In FIG. 1, the picture reading apparatus includes a non-reduction type image pickup element 21, slit plates 22, a fluorescent lamp 23, a light converging lens 24, a focusing lens array 25, and a contact glass 28. Light that is emitted by the fluorescent lamp 23 is converged by the light converging lens 24 and this converging light is irradiated to a document 26 through the contact glass 28. The document 26 is scanned in a main scanning direction, which is perpendicular to the sheet of FIG. 1, by the light from the fluorescent lamp 23. Because the document is transported in a direction indicated by an arrow A in FIG. 1, the scanning of the light from the fluorescent lamp 24 is also made in a sub scanning direction which is perpendicular to the main scanning direction. An irradiation width or length 27 of the light from the fluorescent lamp 23 in the sub scanning direction, where the light is irradiated to the document 26, is limited by the slit plates 22 the edge portions of which form a slit at a portion between the light converging lens 24 and the contact glass 28. This irradiation width is thus limited to less than 30 mm in the sub scanning direction, preferably to less than 2 mm.

On the other hand, light that is reflected from the document 26 is focused by the focusing lens array 25 on the non-reduction type image pickup element 21, and this image pickup element 21 supplies a picture signal indicative of a picture from the document 26. However, there appears irregular reflection light irregularly reflected by a document surface, where the scanning is not made by the emitted light from the light source, or by a portion of the contact glass 28, which irregular reflection light may enter directly the focusing lens array 25, thereby deteriorating the quality of a picture being reproduced from the picture signal supplied by the image pickup element 21. The conventional picture reading apparatus has no effective means for preventing such reflected light from entering directly the focusing lens array and from being led to the image pickup element. Therefore, there is a problem in that the conventional picture reading apparatus does not show enough image focusing performance, because it has no means for preventing undesired light, other than the converged light from the light source effective in supplying a picture signal, from entering directly inside of the focusing lens array.

FIG. 2 shows another example of the conventional picture reading apparatus to which a roof mirror lens array (RMLA) is applied. This picture reading apparatus as shown in FIG. 2 includes an optical path separation mirror (SM) 31, a lens array (LA) 32, a roof mirror array (RMA) 33, a restricting plate (not shown) provided between the LA 32 and the RMA 33, and a housing (not shown) for holding the above mentioned component parts and shielding the inside of the apparatus from external light. Light from an object 34 to be scanned is reflected by the SM 31 and this reflected light passes through the LA 32 and is irradiated to the RMA 33. The lens array 32 has a plurality of lenses arranged consecutively at equal intervals in the main scanning direction, as indicated by an arrow Y in FIG. 2, and each lens of the lens array 32 converges the reflected light from the separation mirror 31 into a converged light which is led to the RMA 33. The separation mirror 31 serves to separate an optical path of light, being led from the object 34 to the lens array 32, from an optical path of the converging light from the lens array toward the SM 31. The roof mirror array 33 which has a plurality of roof-like reflection surfaces arranged consecutively at equal intervals in the main scanning direction, as indicated by the arrow Y in FIG. 2. The converging light, being led from each lens of the lens array 32 to the SM 31, is again reflected by each roof-like reflection surface of the roof mirror array 33, and this reflected light is focused as an image 35 on a position symmetrical to the position of the object 34 with respect to the plane of the picture reading apparatus.

The image 35 is an erect image with respect to the object 34 both in the main scanning direction Y and in the sub scanning direction as indicated by an arrow X in FIG. 2. In particular, this image is a non-reduction erect image having a scale factor equal to 1 in the sub scanning direction X. Therefore, the necessary scanning width is covered by overlapping an image formed by means of a lens of the LA and a roof mirror of the RMA in the sub scanning direction X. The lenses of the LA, the roof-like reflection surfaces of the RMA and the restricting plates must be respectively arranged at equal intervals therebetween, and each lens of the lens array 32 must show essentially the same light quantity distribution. For this reason, the distribution of light quantity of each lens in the LA 32 is predetermined to be uniform in the main scanning direction Y.

However, in the case of the conventional picture reading apparatus as shown in FIG. 2, the emitted light from the light source passes through a transparent portion of the separation mirror, and such light is irregularly reflected or scattered in the RMLA optical system, resulting in a flaring light which particularly lowers the image focusing performance of the picture reading apparatus. In addition, the conventional picture reading apparatus described above employ a slit which is arranged between the light source and the document. However, the use of a slit by the picture reading apparatus requires an increase in the total number of parts needed, and also requires additional time to perform manufacturing steps of positioning and adjustment of a slit in the picture reading apparatus.

SUMMARY OF THE INVENTION

Accordingly, it is a general object of the present invention to provide an improved picture reading apparatus in which the above described problems of the conventional apparatus are eliminated.

Another and more specific object of the present invention is to provide a picture reading apparatus which allows a high quality picture to be generated from a scanned document, by eliminating undesired light other than the converged light from the light source effective in supplying the picture signal. Still another object of the present invention is to provide a picture reading apparatus having a light shield layer formed integrally with a contact glass, ensuring good positioning accuracy for the parts of the apparatus and a reduction of manufacturing costs. The above mentioned objects can be achieved by a picture reading apparatus which comprises a light source for emitting light, a contact glass with which a document is placed in contact so that the document is scanned by the emitted light from the light source along a main scanning line, a lens array in which a plurality of lenses are arranged consecutively at equal intervals therebetween along the main scanning line, each of the plurality of lenses converging a reflected light which is reflected from the document through the contact lens, a roof mirror array in which a plurality of roof-like reflection surfaces for reflecting the converged light from the lens array back to the lens array are arranged, corresponding to the plurality of lenses, at equal intervals therebetween along the main scanning line, a restricting plate provided between the lens array and the roof mirror array for eliminating flaring light between adjacent lenses of the lens array, a housing in which the roof mirror array and the lens array are accommodated to form a roof mirror lens array, a sensor for receiving the converged light reflected by the roof mirror array so that the received light is converted into a picture signal indicative of a picture contained in the document, a separation mirror for reflecting the converged light from the lens array to the sensor separately from an optical path of the reflected light from the document and led to the lens array, and a light shield layer formed integrally with a surface of the contact glass, the light shield layer including a reading portion to which the emitted light from the light source is led to pass through the contact glass for scanning the document, the light shield layer being provided at a portion other than the reading portion on the surface of the contact glass. According to the present invention, it is possible for the integrally formed light shield layer to suitably eliminate undesired light, other than the converged light from the light source effective in supplying a picture signal. The picture reading apparatus with the light shield layer requires no need for positioning and adjustment of a slit which has been used within the conventional apparatus, thus facilitating the assembly and manufacture of the picture reading apparatus because only the contact glass with the integrally formed light shield layer is used.

A further object of the present invention is to provide a picture reading apparatus in which a light shield member is provided between a contact glass and a separation mirror for eliminating the undesired flaring light, ensuring good positioning accuracy for the parts of the apparatus and a reduction in the manufacturing cost thereof. The above mentioned object of the present invention can be achieved by a picture reading apparatus which comprises a light source for emitting light, a contact glass with which a document is placed in contact so that the document is scanned by the emitted light from the light source along a main scanning line, a lens array in which a plurality of lenses are arranged consecutively at equal intervals therebetween along the main scanning line, each of the plurality of lenses converging a reflected light which is reflected from the document through the contact lens, a roof mirror array in which a plurality of roof-like reflection surfaces for reflecting the converged light from the lens array back to the lens array are arranged, corresponding to the plurality of lenses, at equal intervals therebetween along the main scanning line, a restricting plate provided between the lens array and the roof mirror array for eliminating flaring light between adjacent lenses of the lens array, a housing in which the roof mirror array and the lens array are accommodated to form a roof mirror lens array, a sensor for receiving the converged light reflected by the roof mirror array so that the received light is converted into a picture signal indicative of a picture contained in the document, a separation mirror for reflecting the converged light from the lens array to the sensor separately from an optical path of the reflected light from the document and led to the lens array, and a light shield member provided between the light source and the separation mirror for preventing part of the emitted light from the light source from entering directly the interior of the roof mirror lens array. According to the present invention, it is possible for the light shield member to suitably eliminate flaring light, due to the irregular reflection and scattering of the light from the light source, which enters the transparent portion of the separation mirror and is led to the inside of the RMLA. In addition, it is possible for the present invention to prevent the image focusing performance of the picture reading apparatus from deteriorating due to such flaring light.

Other objects and further features of the present invention will be more apparent from the following detailed description when read in conjunction with the accompanying drawings.

DESCRIPTION OF THE PREFERRED EMBODIMENTS

Figure 1:
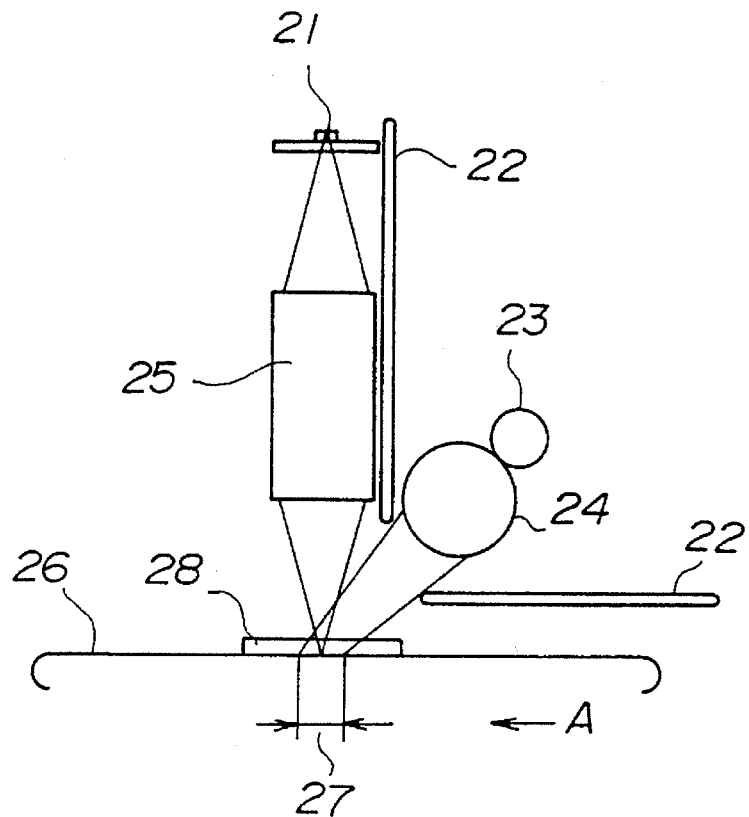
FIG. 1 is a cross sectional view showing an example of a prior art picture reading apparatus to which a focusing lens array is applied.
Figure 2:
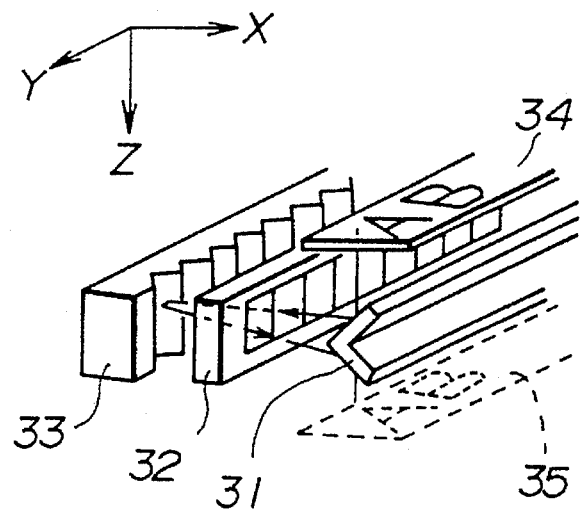
FIG. 2 is a perspective view showing an example of a prior art picture reading apparatus to which a roof mirror lens array (RMLA) is applied.
Figure 3:
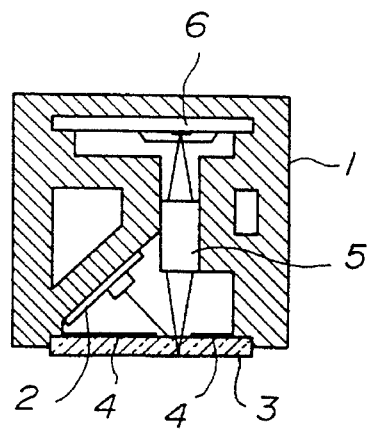
FIG. 3 is a cross sectional view showing an embodiment of a picture reading apparatus according to the present invention to which a focusing lens array is applied.

First, a description will be given of an embodiment of a picture reading apparatus according to the present invention in which a focusing lens array is incorporated, with reference to FIG. 3. In FIG. 3, this picture reading apparatus generally has a housing 1 in which the focusing lens array is accommodated, a light source (LED) 2 for emitting light which is irradiated to a document to be scanned, a contact glass 3 with which the document is brought into contact, a light shield layer 4 formed integrally with the contact glass 3, a non-reduction type focusing lens element 5 with a scale factor equal to 1, the focusing lens element 5 serving as the focusing lens array (or, a so-called rod lens array), and a non-reduction type sensor 6 with a scale factor equal to 1. In this apparatus as shown in FIG. 3, the light shield layer 4 is formed on a top surface of the contact glass 3 and includes a reading portion from which the emitted light from the light source 2 passes through the contact glass 3 to scan the document in a main scanning direction for supplying a picture signal for each scan. Thus, the reading portion of the light shield layer 4 has a width in the main scanning direction, which is necessary for the scanning by the emitted light from the light source. The light shield layer 4 shown in FIG. 3 is provided at a portion on the top surface of the contact glass 3, other than the above described reading portion, which is opposed to the light source 2. The light shield layer 4 serves to eliminate undesired light reflected from the contact glass surface or light reflected from the document through the contact glass 3. The light shield layer 4 may be formed on a surface of the contact glass using a light absorbing material through an appropriate process such as photolithography, coating, or vacuum evaporation. Additionally, the light shield layer 4 may be formed by grinding a contact glass surface at the corresponding portion of the light shield layer 4 into a roughly ground glass surface and by applying a light absorbing material to the ground glass surface.

In the case of the picture reading apparatus shown in FIG. 3, instead of a conventional light source with bar a lens being used, a light source unit in which LED chips are arranged on a substrate to form a light emitting array has recently been used as the light source 2 of the picture reading apparatus in order to reduce the manufacturing cost. However, when such a new light source unit is used as the light source 2, the picture reading apparatus shows a slightly lower light converging performance when compared with that of the conventional apparatus, and light is emitted from the whole surface of a plastic coating which covers light emitting elements (for example, GaAsP or GaAlAs diodes) of the light source 2, which causes undesired light to appear, apart from the converged light being irradiated to the document through the reading portion of the light shield layer 4.

Figure 4:
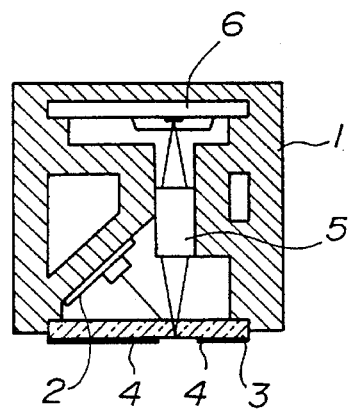
FIG. 4 is a cross sectional view showing another embodiment of the picture reading apparatus of the invention to which a focusing lens array is applied.

FIG. 4 shows another example of the picture reading apparatus according to the present invention. In FIG. 4, those parts which are essentially the same as those corresponding parts of the apparatus shown in FIG. 3 are designated by the same reference numerals, and a description thereof will be omitted. The light shield layer 4 as shown in FIG. 4 is provided on a bottom surface of the contact glass 3 which is opposed to a document to be scanned. Similar to the embodiment shown in FIG. 3, the light shield layer 4 shown in FIG. 4 serves to eliminate flaring light from from the document through the contact glass 3. The light shield layer 4 may be formed through the same process as in the above embodiment shown in FIG. 3. Also, the light shield layer 4 may be made of metal such as chromium or a metallic oxide such as chromium oxide, through an appropriate process including sputtering, vacuum evaporation and the like. Preferably, an opaque metallic film for preventing light reflection is formed through sputtering or a vacuum evaporation process on the top surface of the contact glass 3, opposed to the light source, in addition to the light shield layer 4 formed on the bottom surface as described above. In addition, it is a matter of course that the light shield layer 4 may be formed on both the top and bottom surfaces of the contact glass 3, respectively opposed to the light source 2 and to the document.

Figure 5:
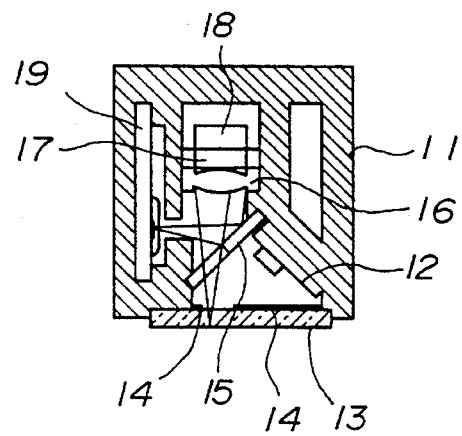
FIG. 5 is a cross sectional view showing an embodiment of a picture reading apparatus according to the present invention to which a roof mirror lens array (RMLA) is applied.

FIG. 5 shows an embodiment of the picture reading apparatus of the present invention to which a roof mirror lens array (RMLA) is applied. This picture reading apparatus shown in FIG. 5 includes a housing 11 in which the RMLA is accommodated, a light source 12 (LED) for emitting light, a contact glass 13 with which a document to be scanned is placed in contact, a light shield layer 14, an optical path separation mirror (SM) 15, positioned substantially perpendicularly to the light source 12, for reflecting the converged light from the RMLA separately from an optical path of the reflected light from the document being led to the RMLA, a lens array (LA) 16 in which a plurality of lenses are arranged at equal intervals therebetween along a main scanning line, each of the lenses converging reflected light from the document through the contact lens 13, a restricting plate 17 for eliminating flaring light between adjacent lenses of the lens array 16, a roof mirror array (RMA) 18 in which a plurality of roof-like reflection surfaces for reflecting the converged light from the lens array 16 back to the lens array 16 are arranged, corresponding to the lenses of the LA 16, at equal intervals therebetween along the main scanning line, and a non-reduction type sensor 19 with a scale factor equal to 1, which receives the converged light reflected by the RMA 18 so that the received light is photoelectrically converted into a picture signal indicative of an image contained in the document. The separation mirror 15 has a transparent portion through which the reflected light from the document passes, and a mirror portion in which the converged light from the RMLA is reflected to the sensor 19. With the thus constructed RMLA used, it is possible to construct the picture reading apparatus so as to be of a smaller size as compared with the size of the above mentioned picture reading apparatus with the focusing lens array being used. Similar to the above embodiments shown in FIGS. 3 and 4, the light shield layer 14 formed on the contact glass 3 allows undesired light, different from the effective irradiation light from the light source 12 for supplying a picture signal, to be eliminated. In a case of the RMLA type apparatus, the optical path separation mirror 15 is provided for separating light being irradiated to a document from light being reflected from the document, and this optical path separation mirror is arranged at a portion different from a portion along the optical axis of the RMLA optical system including the lens array 16. The light that is reflected by the document with respect to an axis parallel to the optical axis of the RMLA and perpendicular to the contact glass and led to the RMLA is asymmetrical with respect to the optical axis L0.

Figure 6:
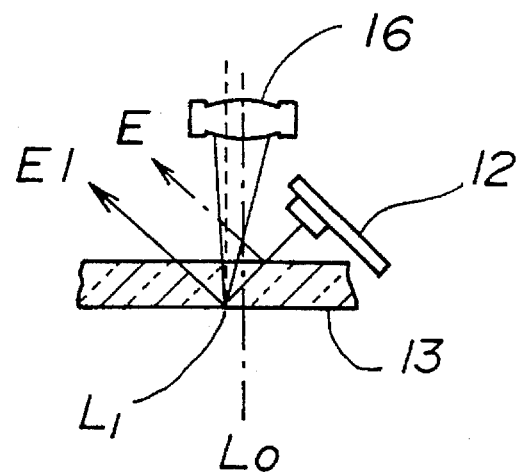
FIG. 6 is a diagram for explaining a major part of the picture reading apparatus shown in FIG. 5.

As is apparent from FIG. 6, the light source 12, the contact glass 13 and the lens array 16 are arranged to form an optical system, such that the light reflected from a document with respect to an axis L1, as indicated by a dotted line in FIG. 6, parallel to the optical axis L0, as indicated by a dot-dash line in FIG. 6 and perpendicular to the contact glass 13 and led to this optical system is asymmetrical with respect to the optical axis L0 of the optical system. Therefore, the emitted light from the light source 12 is reflected by the contact glass 13 in directions as indicated by lines E and E1, the picture reading apparatus is constructed such that the image focusing performance is not easily influenced by light regularly reflected by the contact glass 13.

Figure 7:
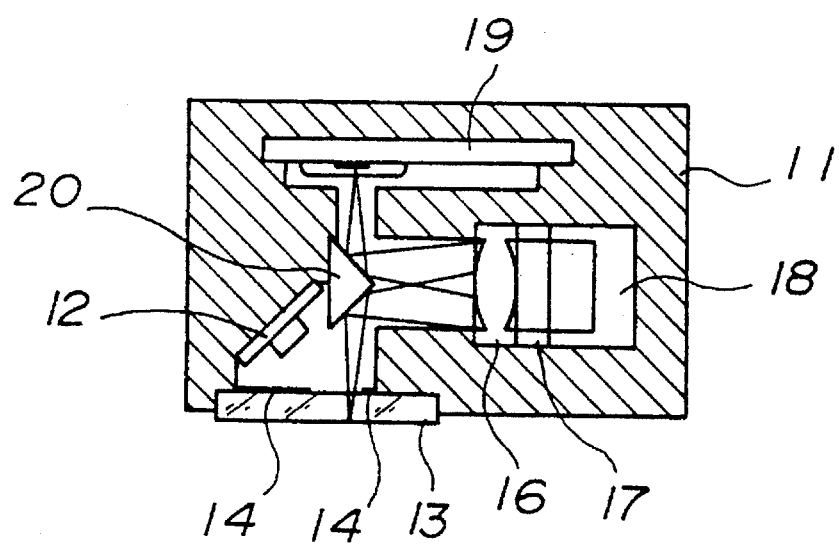
FIG. 7 is a cross sectional view showing another embodiment of the picture reading apparatus of the invention to which a RMLA is applied.

FIG. 7 shows another embodiment of the picture reading apparatus of the present invention in which the RMLA is incorporated. In this picture reading apparatus as shown in FIG. 7, an optical path separation mirror (SM) 20 is formed so as to have two reflection surfaces, a reflected light from a document being reflected by one of the two reflection surfaces of the SM 20 and a converged light from the lens array 16 is reflected by the other reflection surface thereof.

The use of the SM 20 in the picture reading apparatus allows the contact glass 13 and the non-reduction type sensor 19 to be arranged substantially parallel to each other. Thus, the picture reading apparatus as shown in FIG. 7 can be constructed so as to have a smaller height or thickness in the vertical direction, and it is possible to construct a compact optical scanning unit including a facsimile, an image scanner or the like.

Figure 8:
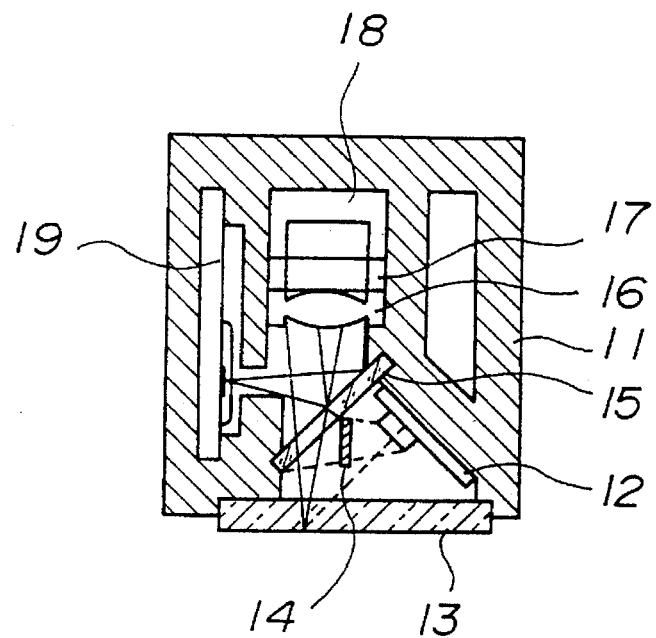
FIG. 8 is a cross sectional view showing still another embodiment of the picture reading apparatus of the invention to which a RMLA is applied.

FIG. 8 shows still another embodiment of the picture reading apparatus of the present invention. In this picture reading apparatus as shown in FIG. 8, a plate-like light shield member 141 is provided between the light source 12 and the optical path separation mirror 15. This light shield member 141 serves to prevent undesired light from the light source 12 from entering the interior of the roof mirror lens array (RMLA). If the emitted light from the light source 12 enters a transparent portion (which is made of glass or plastic material) of the optical path separation mirror 15, the light is diffracted by the separation mirror 15 and scattered in the RMA 18, resulting in flaring light which will deteriorate the image focusing performance of the picture reading apparatus. The light emitted by the light source 12 may be diffracted, particularly on a surface of the transparent portion of the optical path separation mirror 15, toward the lens array (LA) 16, and such diffracted light may be led to the interior of the RMLA optical system. Thus, the light shield member 141 is effective in eliminating the undesired flaring light from entering the RMLA. Similar to the apparatus shown in FIG. 5, it is possible to form additionally the light shield layer 14, integrally with the contact glass 13, which is provided on a surface of the contact glass 13 in the picture reading apparatus shown in FIG. 8, for eliminating or shutting out undesired flaring light, different from the converging light used for the scanning of the document. This light shield layer 14 on the contact glass 13 serves to eliminate undesired light, including light reflected from a surface of the contact glass 13 which is opposed to the mirror 15 and light emitted by the light source 12 which is different from the converging light used for the scanning of the document.

Figure 9:
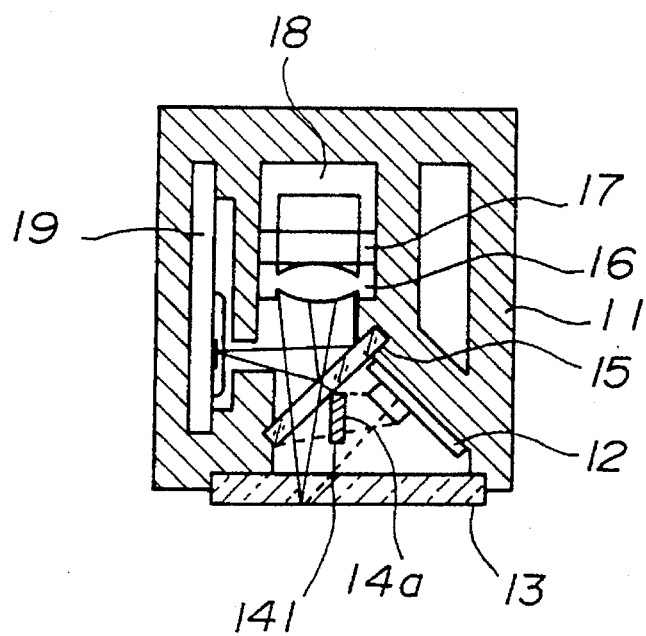
FIGS. 9 through 12 are cross sectional views showing, respectively, further embodiments of the picture reading apparatus to which a RMLA is applied.

FIG. 9 shows a further embodiment of the picture reading apparatus of the present invention in which a light shield plate 141 is provided between the light source 12 and the optical path separation mirror 15. This light shield plate 141 has a light absorbing layer 14a which is formed on a surface of the light shield plate 141. With this light absorbing layer 14a formed on the light shield plate 141, it is possible to eliminate effectively undesired flaring light irregularly reflected or scattered by the surface of the light shield plate 141. This light absorbing layer 14a may be formed on a surface of the light shield plate 141 using a light absorbing material through an appropriate process such as photolithography, coating, vacuum evaporation or the like. The light absorbing layer 14a may be also formed by grinding the surface of the light shield plate 141 into a roughly ground surface and by applying a light absorbing material to the ground surface. In addition, there are several methods of forming the light shield plate 141 with the light absorbing layer 14a. One method is that the light shield plate 141 is made of aluminum alloy and a surface of the light shield plate 141 is chemically processed by etching using acid or alkali to form a black film of aluminum oxide $Al_2O_3$ on the surface of the light shield plate 141. Another method is that the light shield plate 141 is made of copper alloy and a surface of the light shield plate 141 is processed to deposit a black light absorbing layer thereon.

The light source which is used in the picture reading apparatus shown in FIGS. 8 and 9 may be a light source unit in which LED chips are linearly arranged on a substrate to form a light emitting array. The use of this light source unit will enable a reduced quantity of undesired flaring light, a low manufacturing cost, easy assembly and adjustment for the manufacture, and so on. However, it is a matter of course that a fluorescent lamp, a cold cathode fluorescent lamp, a LED with bar lens, or a halogen lamp can be used instead of the above described light source unit in the picture reading apparatus shown in FIGS. 8 and 9.

Figure 10:
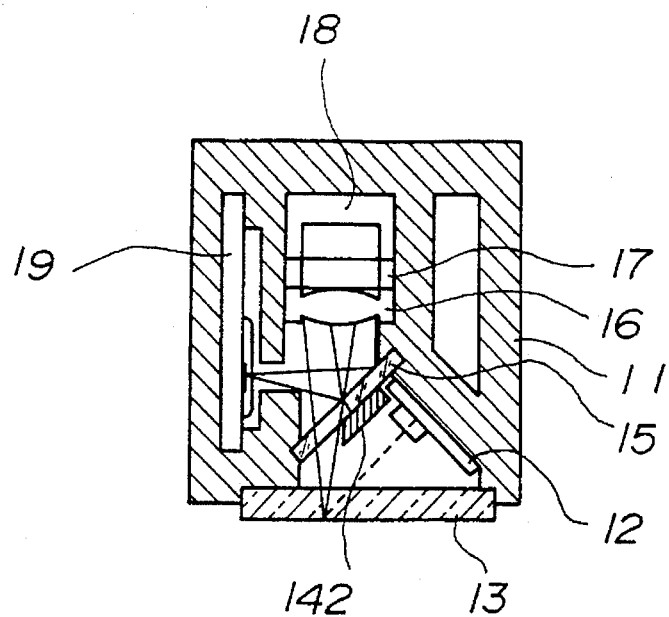
Figure 11:
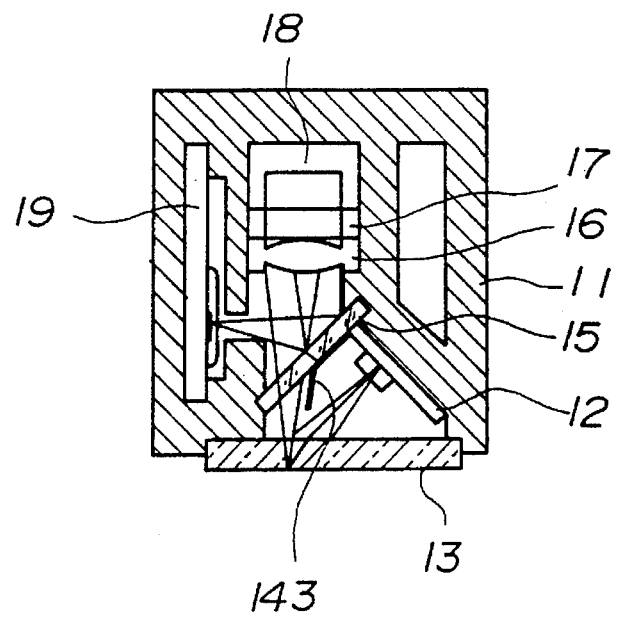
Figure 12:
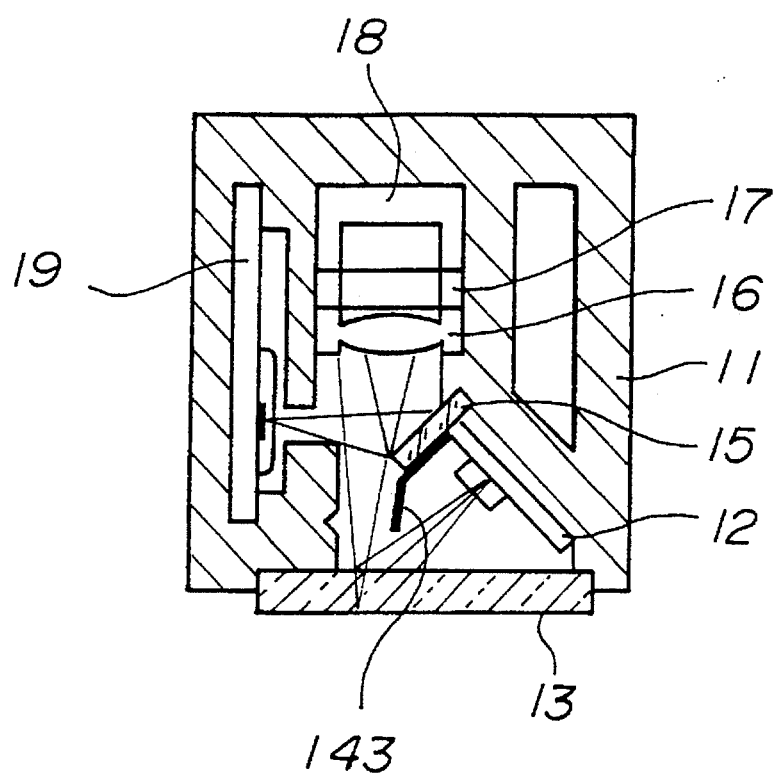

FIGS. 10 through 12 show further embodiments of the picture reading apparatus of the present invention. In the picture reading apparatus as shown in FIG. 10, a light shield plate 142 which is provided between the light source 12 and the optical path separation mirror 15 is placed in contact with a reverse surface of the separation mirror 15. This light shield plate 142 serves to eliminate undesired light, which is different from the effective irradiation light from the light source 12 for supplying a picture signal. The undesired light includes light that is irregularly reflected by the top surface of the contact glass 13 and led to the separation mirror 15, and light that is emitted by the light source 12 and led directly to the separation mirror 15. With this light shield plate 142 being used, the picture reading apparatus can suitably eliminate such undesired light, thereby preventing the flaring light from entering the separation mirror 15.

In the picture reading apparatus shown in FIG. 11, a L-shaped light shield plate 143 with a light absorbing layer formed on a surface thereof, which is provided between the light source 12 and the optical path separation mirror 15, is placed at one half portion thereof in contact with a reverse surface of the separation mirror 15. This light shield plate 143 is bent at the middle portion thereof, such that the other portion of the light shield plate 143 is faced to the contact glass 13. This light shield plate 143 serves to eliminate undesired light, which is different from the effective irradiation light from the light source 12 for supplying a picture signal. The undesired light includes light that is irregularly reflected by the top surface of the contact glass 13 and led to the separation mirror 15, and light that is emitted by the light source 12 and led directly to the separation mirror 15. In addition, this L-shaped light shield plate 143 on which a light absorbing layer is formed serves to eliminate effectively undesired light that is emitted by the light source 12 and reflected or scattered on the surface of the light shield plate 143.

In the picture reading apparatus shown in FIG. 12, a L-shaped light shield plate 143, similar to that shown in FIG. 11, is placed at one half portion thereof in contact with a reverse surface of an optical path separation mirror 151 which is different from the optical path separation mirror 15 shown in FIG. 11. The separation mirror 151 shown in FIG. 12 has only a mirror portion for reflecting the converged light from the RMLA to the sensor 19 and it has no transparent protion. The reason for this half-sized separation mirror is to reduce the manufacturing cost.

Further, the present invention is not limited to the above described embodiments, and variations and modifications may be made without departing from the scope of the present invention.

What is claimed is:

1. A picture reading apparatus which comprises:

a housing;

a light source located in said housing and emitting light wherein said light source comprises an array of light emitting diodes;

a contact glass against which a document is positionable wherein said light emitting diodes emit light toward said contact glass so that the document is scanned by the emitted light from said light emitting diodes along a main scanning line;

a lens array in which a plurality of lenses are arranged consecutively at equal intervals therebetween along the main scanning line, each of said plurality of lenses converging a reflected light which is reflected from the document through the contact glass;

a roof mirror array, located in said housing and positioned substantially perpendicularly to the light source, in which a plurality of roof-like reflection surfaces reflecting the converged light from the lens array back to the lens array are arranged, corresponding to said plurality of lenses, at equal intervals therebetween along the main scanning line;

a restricting plate provided between said lens array and said roof mirror array and eliminating flaring light between adjacent lenses of said lens array wherein said roof mirror array and said lens array are accommodated in said housing to form said roof mirror lens array;

a sensor located on said housing and receiving the converged light reflected by said roof mirror array so that said received light is converted into a picture signal indicative of a picture contained in the document;

an optical separation mirror located in said housing, said optical mirror reflecting the converged light from the lens array to said sensor separately from an optical path of the light reflected from the document and led to the lens array; and a light shield layer formed integrally with a surface of the contact glass so as to be spaced from said sensor and be located inside said housing, said light shield layer including a reading portion to which the emitted light from the light emitting diodes is led to pass through the contact glass for scanning the document, said light shield layer being provided at a portion other than said reading portion on said surface of the contact glass wherein said separation mirror, said light emitting diodes, and said light shield layer are located within a lower portion of said housing and wherein an internal space of said housing containing said light emitting diodes is bounded by said contact glass, said light emitting diodes and said separation mirror.

2. The apparatus as claimed in claim 1, wherein said light shield layer is made of a light absorbing material and formed on a top surface of said contact glass.

3. The apparatus as claimed in claim 1, wherein said light shield layer is made of a light absorbing material and formed on a bottom surface of said contact glass.

4. The apparatus as claimed in claim 1, wherein said light shield layer is made of a light absorbing material and formed on both top and bottom surfaces of said contact glass.

5. A picture reading apparatus which comprises:

a housing;

a light source located in said housing and emitting light wherein said light source comprises an array of light emitting diodes;

a contact glass against which a document is positionable wherein said light emitting diodes emit light towards said contact glass so that the document is scanned by the emitted light along a main scanning line;

a lens array in which a plurality of lenses are arranged consecutively at equal intervals therebetween along the main scanning line, each of said plurality of lenses converging a reflected light which is reflected from the document through the contact glass;

a roof mirror array, located in said housing and positioned substantially perpendicularly to the light source, in which a plurality of roof-like reflection surfaces reflecting the converged light from the lens array back to the lens array are arranged, corresponding to said plurality of lenses, at equal intervals therebetween along the main scanning line;

a restricting plate provided between said lens array and said roof mirror array and eliminating flaring light between adjacent lenses of said lens array wherein said roof mirror array and said lens array are accommodated in said housing to form a roof mirror lens array;

a sensor located on said housing and receiving the converged light reflected by said roof mirror array, said sensor converting said received light into a picture signal indicative of a picture contained in the document;

an optical separation mirror located in said housing and reflecting the converged light from the lens array to said sensor separately from an optical path of the light reflected from the document and led to the lens array; and a light shield provided between said light emitting diodes and said separation mirror, said light shield being spaced from both said light emitting diodes and said sensor, said light shield preventing part of the emitted light from said light emitting diodes from entering directly the inside of said roof mirror lens array wherein said separation mirror, said light emitting diodes, and said light shield layer are located within a lower portion of said housing and wherein an internal space in said housing containing said light emitting diodes is bounded by said contact glass, said light emitting diodes and said separation mirror.

6. The apparatus as claimed in claim 5, wherein said light shield means includes a light absorbing layer which is made of a light absorbing material and formed on a surface of said light shield means.

7. A picture reading apparatus comprising:

a housing;

a light source located in said housing and wherein said light source comprises an array of light emitting diodes along a main scanning line;

a contact glass with which a document is positionable wherein said light emitting diodes emit light towards said contact glass so that the document is scanned by the emitted light from said light emitting diodes along a main scanning line;

a lens array in which a plurality of lenses are arranged consecutively at equal intervals therebetween along the main scanning line, each of said plurality of lenses converging a reflected light which is reflected from the document through the contact glass;

a roof mirror array located in said housing and positioned substantially perpendicularly to the light source, in which a plurality of roof-like reflection surfaces reflecting the converged light from the lens array back to the lens array are arranged, corresponding to said plurality of lenses, at equal intervals therebetween along the main scanning line;

a restricting plate provided between said lens array and said roof mirror array, said restricting plate eliminating flaring light between adjacent lenses of said lens array wherein said roof mirror array and said lens array are accommodated in said housing to form a roof mirror lens array;

a sensor located on said housing and receiving the converged light reflected by said roof mirror array, said sensor converting said received light into a picture signal indicative of a picture contained in the document;

an optical separation mirror reflecting the converged light from the lens array to said sensor separately from an optical path of the light reflected from the document and led to the lens array; and a light shield located in said housing and provided between said light emitting diodes and said separation mirror, said shield being spaced from said sensor and preventing part of the emitted light from said light emitting diodes from entering directly the inside of said roof mirror lens array wherein said separation mirror, said light emitting diodes, and said light shield are located within a lower portion of said housing and said light shield is spaced from said light emitting diodes and wherein an internal space of said housing containing said light emitting diodes is bounded by said contact glass, said light emitting diodes and said separation mirror.

8. The apparatus as claimed in claim 7, wherein said light shield means includes a light absorbing layer which is made of a light absorbing material and formed on a surface of said light shield means.

9. The apparatus as claimed in claim 7, wherein said light shield means has a first part formed in contact with said reverse surface of said separation mirror, said light shield means being bent at an intermediate portion thereof to form a L-shaped member including a second part not being in contact with said reverse surface of said separation mirror.

10. The apparatus as claimed in claim 9, wherein said light shield means includes a light absorbing layer which is made of a light absorbing material and formed on a surface of said light shield means.

11. The apparatus as claimed in claim 9, wherein said light shield means has a portion provided between the light emitting diodes and the separation mirror for preventing part of a reflected light, reflected by said light shield means, from entering directly the inside of the roof mirror lens array.

12. The apparatus as claimed in claim 1, wherein said light emitting diodes are of a type which emits a diffuse illuminating light.

13. The apparatus as claimed in claim 5, wherein said light emitting diodes are of a type which emits a diffuse illuminating light.

14. The apparatus as claimed in claim 7, wherein said light emitting diodes are of a type which emits a diffuse illuminating light.

* * * * *